United States Patent
Britton et al.

(10) Patent No.: US 6,279,030 B1
(45) Date of Patent: Aug. 21, 2001

(54) DYNAMIC JAVA™ CLASS SELECTION AND DOWNLOAD BASED ON CHANGEABLE ATTRIBUTES

(75) Inventors: Kathryn H. Britton; Stephen Graham; David Louis Kaminsky, all of Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/190,894

(22) Filed: Nov. 12, 1998

(51) Int. Cl.$^7$ .................................................. G06F 15/16

(52) U.S. Cl. ........................... 709/203; 707/10; 709/315; 717/7; 717/8; 717/9

(58) Field of Search .............................. 707/10, 104, 200, 707/103; 709/203, 200, 201; 717/7–9

(56) References Cited

U.S. PATENT DOCUMENTS

| | | | |
|---|---|---|---|
| 5,084,813 | * 1/1992 | Ono ........................................... | 717/3 |
| 5,410,698 | * 4/1995 | Danneels et al. ..................... | 709/331 |
| 5,557,724 | * 9/1996 | Sampat et al. ........................ | 345/327 |
| 5,603,027 | * 2/1997 | Ohkami ................................. | 707/200 |
| 5,608,874 | * 3/1997 | Ogawa et al. ......................... | 709/246 |
| 5,619,710 | * 4/1997 | Travis, Jr. et al. ................... | 709/203 |
| 5,642,407 | * 6/1997 | He ......................................... | 379/87 |

(List continued on next page.)

OTHER PUBLICATIONS

Harbison, S. and Steele, G. "C: A Reference Manual". Englewood Cliffs, Prentice Hall, 1991. p. 228–229.*
Kernighan, B. and Richie, D. "The C Programming Language". Englewood Cliffs, Prentice Hall, 1978. p. 54–56.*
Richey, T. "Java!", Indianapolis: New Riders, 1995, pp. 325–334.*
Business Editors, "IBM licenses Java technology from Sun Microsystems for use in Internet products", Business Wire, Dec. 6, 1995.*
"Java Dynamic Class Loader", IBM Technical Disclosure Bulletin, vol. 39, No. 11, 1996, pp. 107–108.*
Liang, S. and Bracha, G. "Dynamic Class Loading in the Java™ Virtual Machine", Proceedings of the ACM Conference on Object–Oriented Programming, Systems, Languages, and Applications, Oct. 18–22, 1998, pp. 36–44.*

*Primary Examiner*—Jean R. Homere
*Assistant Examiner*—Luke S Wassum
(74) *Attorney, Agent, or Firm*—Jeanine S. Ray-Yarletts; Marcia L. Doubet

(57) ABSTRACT

A method, system, and computer-readable code with which a program component can be dynamically selected for downloading, based on current values of one or more changeable attributes. Multiple versions of a program component are available, and a specific version is dynamically selected for downloading based on current attribute values. Attribute values may represent a user's authorization privileges, current working environment, preferences, network connection type, status, etc. In this manner, software can be optimized for particular users or groups of users, or particular environments of hardware and/or software, while still providing applications that are usable by a wide range of users in a wide range of operating environments. In another aspect, this dynamic selection based on attributes can be used to select a version of a component for remote execution, instead of for downloading. The dynamic selection process may occur on a server in the network, or on the client's local machine. In the latter case, selected component versions may be loaded from local storage instead of downloading them from a server. Administrative policy information based on the user's identity and/or group membership may be used to generate the current attribute values, reflecting one or more of: a user's current working environment, authorization privileges, preferences, network connection type, and status.

4 Claims, 14 Drawing Sheets

U.S. PATENT DOCUMENTS

| | | | |
|---|---|---|---|
| 5,727,950 | * | 3/1998 | Cook et al. .......................... 434/350 |
| 5,822,416 | * | 10/1998 | Goodacre et al. .................. 379/142 |
| 6,018,725 | * | 1/2000 | Boucher et al. .................... 705/401 |
| 6,065,046 | * | 5/2000 | Feinberg et al. ................... 709/216 |
| 6,076,166 | * | 6/2000 | Moshfeghi et al. ................. 713/201 |
| 6,078,889 | * | 6/2000 | Boucher et al. ........................ 705/1 |
| 6,081,850 | * | 6/2000 | Garney .................................. 710/15 |

* cited by examiner

700 Component_for_UI.A=B : UI_for_graphics

710 Component_for_UI.A AND (NOT B) : UI_for_text

720 Component_for_UI.C=CDPD : www.codeserver.com/cdpd

730 Component_for_UI.DEFAULT : UI_for_text

750 Component_for_print
760    XYZ > 15 -> Print_for_XYZ
770    dept_nbr = C80*3 -> Print_for_C80

780 Component_for_calculations
790    D = * -> Calc_Component

```
class MortgageParameters {
    float loanSize;
    float mortgageDuration;
    float interestRate;
}
```

FIG. 8B

```
class MortgageCalc {
    public static void main () {
        // allocate an object to hold the parameters
        MortgageParameters mortgageParameters = new
        MortgageParameters ();
        // allocate an input object, then use it to get the user's input
        UserInput userInput = new UserInput ();      802
        userInput.getInput (mortgageParameters);
        // Calculate the rate               804
        float payment = RateCalculator.CalculateRate
        (mortgageParameters);
        // display the results          806
        UserOutput userOutput = new UserOutput ();
        userOutput.display (payment);
    }
}
```

```
class RateCalculator {
    static float CalculateRate (MortgageParameters mortgageParameters) {
        float payment;
        // calculate the rate using the standard formula based on data in mortgageParameters object
        return payment;
    }
}
```

FIG. 8C

```
class UserInput__GUI {
// GUI version of the interface
UserInput () { // null constructor
} getInput (MortgageParameters mortgageParameters) {
    create a new GUI window
    create a text string in the window marked "Loan Size: "
    create an input area next to that string
    on the next line down,  create a text string in the window marked
"Mortgage Duration:"
    create an input area next to that string
    on the next line down,  create a text string in the window marked
"Interest Rate:"
    create an input area next to that string
    create a button marked OK
    when the user presses the OK button, copy the data from the
input areas
    into the corresponding fields of
        the mortgageParameters object
    return
}
}
```

```
class UserInput__TEXT {
// Text version of the input class
UserInput () { // null constructor
} getInput (MortgageParameters mortgageParameters) { print the string "Enter the Loan Size, then press ENTER"
    get the loan size input
    set the corresponding field of the mortgageParameters object print the string "Enter the Mortgage Duration, then press ENTER"
    get the mortgage duration input
    set the corresponding field of the mortgageParameters object print the string "Enter the Interest Rate, then press ENTER"
    get the interest rate input
    set the corresponding field of the mortgageParameters object return
}
}
```

```
class UserOutput_GUI {
// Text version of the output class
UserOutput () { // null constructor
}
display (MortgageParameters mortgageParameters, float mortgagePayment) {
    create a new GUI window
    create a text string in the window marked "Mortgage Payment"
    create a field containing the value of mortgagePayment
    create a graph of remaining loan amount over time
}
}
```

FIG. 8E1

```
class UserOutput__TEXT {
// Text version of the output class
UserOutput () { // null constructor
} display (MortgageParameters mortgageParameters, float mortgagePayment) {
    print the string "The mortgage payment is: "
    print mortgagePayment
    return
}
}
```

810 UserInput.GUI=true:UserInput__GUI ⟵822
820 UserInput.GUI=false:UserInput__TEXT
830 UserOutput.GUI=true:UserOutput__GUI
840 UserOutput.GUI=false:UserOutput__TEXT

FIG. 8F2

850 UserInput.network_speed<=14:UserInput__TEXT
860 UserInput.(network_speed>14) AND (GUI=true):UserInput__GUI
870 *.network_speed < 14 : *__TEXT
       871   872
880 Mortgage Calc.DEFAULT:MortgageCalc ⟵882

DYNAMIC JAVA™ CLASS SELECTION AND DOWNLOAD BASED ON CHANGEABLE ATTRIBUTES

BACKGROUND OF THE INVENTION

1. Field of the Invention

The present invention relates to a computer system, and deals more particularly with a method, system, and computer-readable code that dynamically selects program components based on current values of one or more changeable attributes, and downloads those components on demand during program execution.

2. Description of the Related Art

Computer programs often provide different access capabilities to different users, based upon a user's role or classification. For example, a payroll application may enable an employee to view his salary, year-to-date tax information, and other relevant payroll data, while a management status is required before a user can change the values of those fields—or before the user can view the same type of information for multiple employees. As another example, a software code library management system may enable users of all classifications to view code modules, but may limit the ability to change the modules to users whose log-on information indicates that they are developers authorized to make such changes. This log-on information may be in the form of a user password, user department number, or other identifying information.

This type of access control is provided by coding appropriate authorization checks into the software, so that only the intended users are allowed to execute certain parts of the code. If an unauthorized user attempts to access that part of the code, an error message may be issued, or the code may simply do nothing until the user selects something for which he is authorized.

In one scenario, the user of this type of software may have the entire application loaded on his workstation, giving him in effect a "private" copy of the software that is not shared with other users. Or, in a second scenario, the application software may physically reside at a server. Each user wishing to execute the application establishes a network connection to the server, so that a single copy of the software is shared by multiple users. Typically, the data that is accessed (e.g. the payroll information, or the stored code modules, discussed above) when using an application that performs authorization checking will be stored remotely from the user's workstation, in a data repository (such as a database) that is accessible to multiple users (again, by making a network connection to a server).

With the advent of programming languages and techniques that allow dynamic location of code modules during program execution, a third scenario is possible. Some portion of the application software is resident on the user's workstation, with additional modules being stored elsewhere. There are a number of reasons why this mode of operation may be desirable. For example, the amount of code stored on the user's workstation can be decreased when modules are stored remotely. In addition, the user can have access to updated versions of code more easily when modules are stored in a centralized remote location, and code maintenance can be simplified, because each user's individual machine does not need to be separately updated. One technique with which this mode of execution is supported is through use of the Remote Procedure Call ("RPC") protocol. With RPC, a programmer codes a module invocation (i.e. a procedure call) in the normal manner for the programming language in which he is writing, but only a "stub" for that module is generated during program compilation (where a "stub" is a special construct enabling the program to successfully compile without resolving the address of the referenced procedure). If the procedure is actually called during runtime, a request to execute the code will be forwarded to a server where the module is available (hence, the procedure call is a "remote" procedure call). That server will perform the function of the procedure, and return the results to the user's workstation, transparently to the user. (For a detailed description of RPC, refer to international standard ISO/IEC 11578, "Remote Procedure Call (RPC)", dated 1996.)

Another technique that enables operation in this third scenario, which is usable in object-oriented environments, is known as "DSOM", or "Distributed System Object Model". "SOM", or "System Object Model", is an International Business Machines Corporation ("IBM") implementation of the CORBA (Common Object Request Broker Architecture) standard developed by the Object Management Group. (SOM is a registered trademark of IBM, and CORBA is a registered trademark of Object Management Group, Inc.) SOM defines a way to create objects that can be accessed by programs without regard to the programming language in which the program is written, the specific compiler used to compile the programs, etc. DSOM, also from IBM, extends the SOM by defining a way to distribute SOM objects, so that they can be accessed by remotely executing applications. (The details of CORBA, SOM, and DSOM are beyond the scope of this discussion. Reference may be made to "The Common Object Request Broker: Architecture and Specification", OMG Document Number 91.12.1 Revision 1.1, for more information on CORBA, and to "SOMobjects Publications", IBM document number S96F-8649, for more information on SOM and DSOM.)

The Java programming language provides yet another technique for operating with only some portion of the executable program being loaded on the user's workstation. (Java is a trademark of Sun Microsystems, Inc.) Whereas RPC and DSOM provide for accessing remotely-stored procedures and objects, Java provides a different approach. When executing a Java applet, code modules are loaded from their remote storage onto the user's workstation if and when they are needed (i.e. if they are actually invoked during execution), so that execution occurs locally. (In addition, Java Remote Method Invocation, or "RMI", provides for execution of remotely-located Java methods, in a similar manner to that described above for remote execution using RPC and DSOM.)

The three techniques that have been described for operating in the third scenario described above all provide for code sharing—whether by accessing a remotely-stored, shared copy of the code (as described for RPC, DSOM, and RMI), or by downloading a copy to users needing the code (as described for Java applets). However, each of these techniques has in common that a single, predetermined copy of the software will be accessed. If that software contains code that is authorization-protected, as described above, then the software downloaded onto the user's workstation will often contain some amount of code that this user cannot access (because the user likely will not qualify for all the defined access levels). This results in wasted storage space on the user's workstation, and a decrease in execution efficiency. While this may be merely a less-than-optimal working environment for some users, it can be a very serious problem for users of workstations when storage space is at a premium. For example, the user may be using a handheld computer such as the WorkPad from IBM. ("WorkPad" is a registered trademark of IBM.) Storage space on handheld computers is typically limited to several megabytes, in order to keep the device small and lightweight. (Storage constraints may exist on much larger machines as well, at a point in time, as is commonly known.)

In addition to wasting space by storing inaccessible authorization-protected code, space is also wasted if the downloaded software provides for execution in environments that are not supported by the user's workstation. For example, a module that displays the user interface may include code for several different types of display devices, and query the user's hardware at run-time to determine which device type is installed—and accordingly, which portion of the software to execute. Or, a report-generating software routine may contain code to generate the report on the display device as well as by printing it on an attached printer, leaving the final output choice to the user. If the user does not have a printer attached to his computer, then the printing logic (which may be extensive) is unusable. The greater the number of different situations provided for by the software, the more likely it is that this type of redundant code will exist.

Accordingly, what is needed is a technique whereby a program component can be dynamically selected and downloaded, based on current values of one or more changeable attributes. The present invention provides a technique whereby multiple versions of a program component are available, and a specific version can be dynamically selected and downloaded based on current attribute values. Attribute values may represent a user's authorization privileges, current working environment, preferences, network connection type, status, etc. In this manner, software can be optimized for particular users or groups of users, or particular environments of hardware and/or software, while still providing applications that are usable by a wide range of users in a wide range of operating environments.

SUMMARY OF THE INVENTION

An object of the present invention is to provide a technique whereby a program component can be dynamically selected and downloaded based on current values of changeable attributes.

Another object of the present invention is to provide a technique whereby multiple versions of a program component are available, and a specific version can be dynamically selected from the available versions based on current values of changeable attributes.

It is another object of the present invention to provide for dynamically selecting a program component based upon a user's authorization privileges, current working environment, preferences, network connection type, status, or some combination thereof.

It is yet another object of the present invention that the values of changeable attributes may be provided from a plurality of sources, including the user, configuration mechanisms on the user's machine, the network gateway, or a network database of user or group preferences and administrative policy information.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for use in a computing environment capable of having a connection to a network, for dynamically selecting a program component for downloading based on current values of changeable attributes. This comprises: a plurality of program components, each of the program components having at least one selectable version; a plurality of predicate records corresponding to the plurality of program components, each of the records specifying a set of target attribute values, and further specifying a component reference to one of the selectable versions; a subprocess for receiving a request for downloading one of the program components; a subprocess for receiving a set of currently-applicable attribute values; a subprocess for determining if one or more of the predicate records corresponds to the requested component; a subprocess for selecting, wherein one of the selectable versions is selected by comparing the set of currently-applicable attribute values to the set of target attribute values in the corresponding predicate records when the subprocess for determining has a positive outcome, and wherein a predetermined one of the selectable versions is selected when the subprocess for determining has a negative outcome; and a subprocess for returning a result of the subprocess for selecting. Preferably, these subprocesses operate on a server in the network, or on a client in the network. The target attribute values and currently-applicable attribute values may comprise characteristics of a user's current working environment, authorization privileges, preferences, network connection type, and/or status. Optionally, the plurality of predicate records may specify a special default predicate corresponding to each of one or more of the program components. In addition, a subprocess for specifying the received set of currently-applicable attribute values may be included. Preferably, this subprocess operates on a client in the network, on the server, or on an intermediate machine in the network. It may also operate on more than one of these, wherein a chaining approach is used between said more than one operations. This subprocess may further comprise a subprocess for using administrative policy information based on said user's identity and/or group membership, and reflecting: a user's current working environment, authorization privileges, preferences, network connection type, and/or status.

A software-implemented technique is also provided for use in a computing environment capable of having a connection to a network, for dynamically selecting a program component for remote execution based on current values of changeable attributes. This technique for remote execution comprises: a plurality of program components, each of the program components having at least one selectable version; a plurality of predicate records corresponding to the plurality of program components, each of the records specifying a set of target attribute values, and further specifying a component reference to one of the selectable versions; a subprocess for receiving a request to execute one of the program components; a subprocess for receiving a set of currently-applicable attribute values; a subprocess for determining if one or more of the predicate records corresponds to the requested component; a subprocess for selecting, wherein one of the selectable versions is selected by comparing the set of currently-applicable attribute values to the set of target attribute values in the corresponding predicate records when the subprocess for determining has a positive outcome, and wherein a predetermined one of the selectable versions is selected when the subprocess for determining has a negative outcome; and a subprocess for returning a result of the subprocess for selecting. Preferably, the subprocess for selecting operates on a server in the network, or on a client in the network. In the latter case, the subprocess for executing may also operate on the client. Optionally, a subprocess for sending a request for the selected version to the server may be included, wherein the subprocess for executing operates on the server.

The present invention will now be described with reference to the following drawings, in which like reference numbers denote the same element throughout.

BRIEF DESCRIPTION OF THE DRAWINGS

FIG. 7 illustrate examples of predicate records that may be used with the present invention, showing several alternatives for predicate record syntax; and FIGS. 8A–8F2 illustrate a sample program using the present invention.

DESCRIPTION OF THE PREFERRED EMBODIMENT

Figure 1:
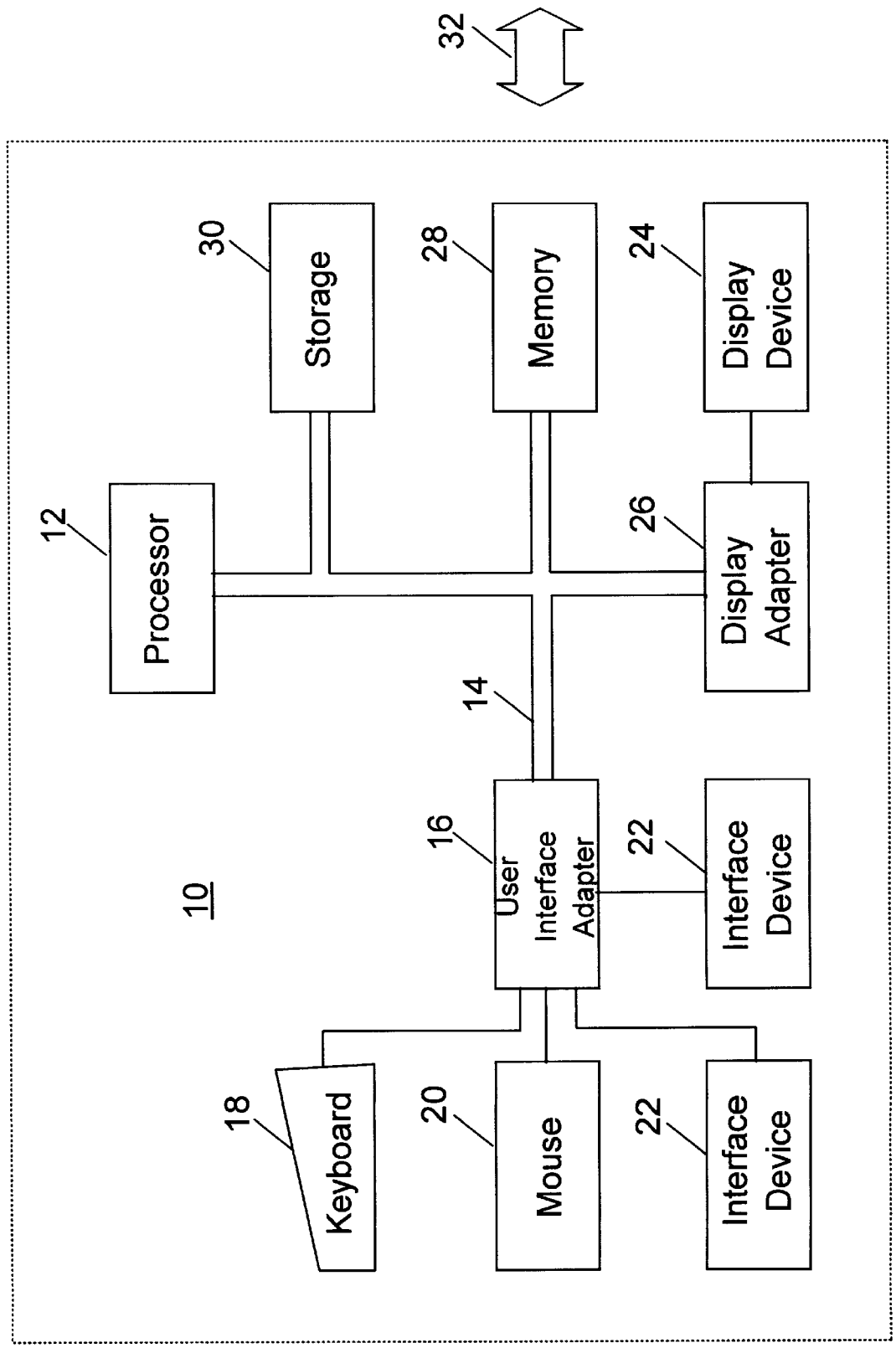
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
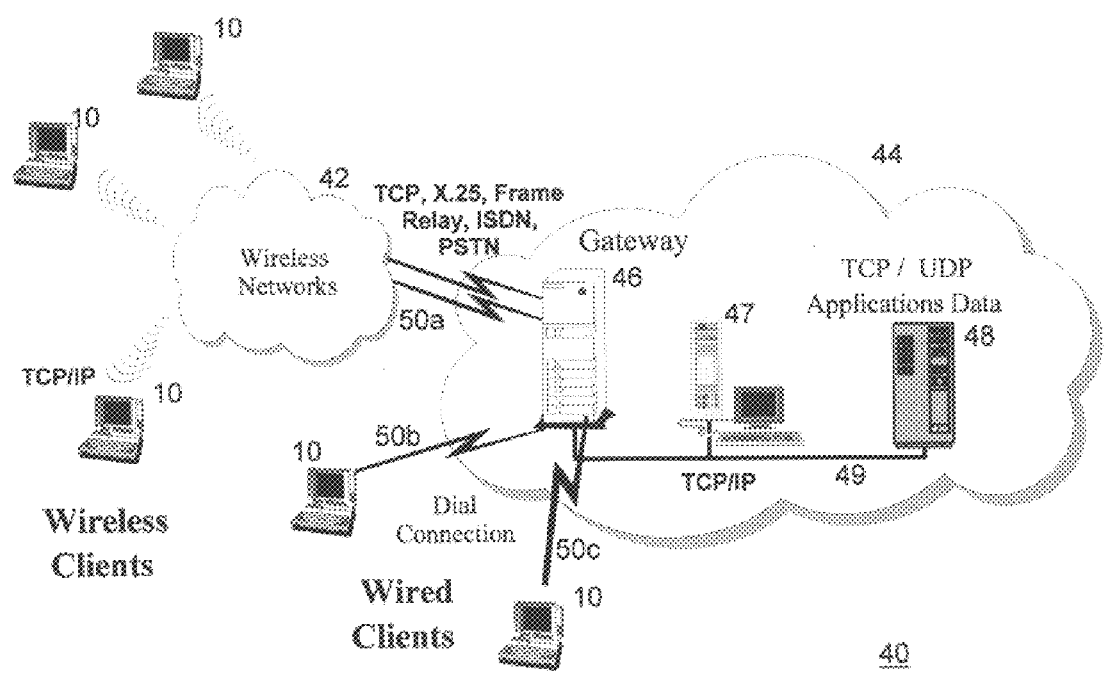
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as a computer software program. Availability of a network connection is assumed, which must be operable at the time when the dynamic loading software on a user's workstation is invoked. In the preferred embodiment, the implementation of the software that dynamically selects and downloads components operates on a server in the network, as one or more modules (also referred to as code subroutines, or "objects" in object-oriented programming) which are invoked in response to a request for a component sent to the server by a client. (In an alternative embodiment, the selection and download software may operate on the client's workstation.) The logic implementing this dynamic selection and download may be integrated with the code of a server (such as a Web server), or it may be implemented as one or more separate utility modules, which provide services that are accessed by the server, without deviating from the inventive concepts disclosed herein. The implementation of the attribute insertion logic (discussed in detail below) may execute on a client computer, on a server, on an intermediate machine in the network between the client and server, or some combination of more than one of these devices. The server may be functioning as a Web server, where that Web server provides services in response to requests from a client connected through the Internet. Alternatively, the server may be in a corporate intranet or extranet of which the client's workstation is a component. In the general case, the present invention operates independently of the communications protocol used to send messages or files between the client and server, although a specific aspect is discussed herein which uses the HTTP protocol running on TCP/IP.

The preferred embodiment of the present invention will now be discussed in more detail with reference to FIGS. 3 through 8.

Figure 3:
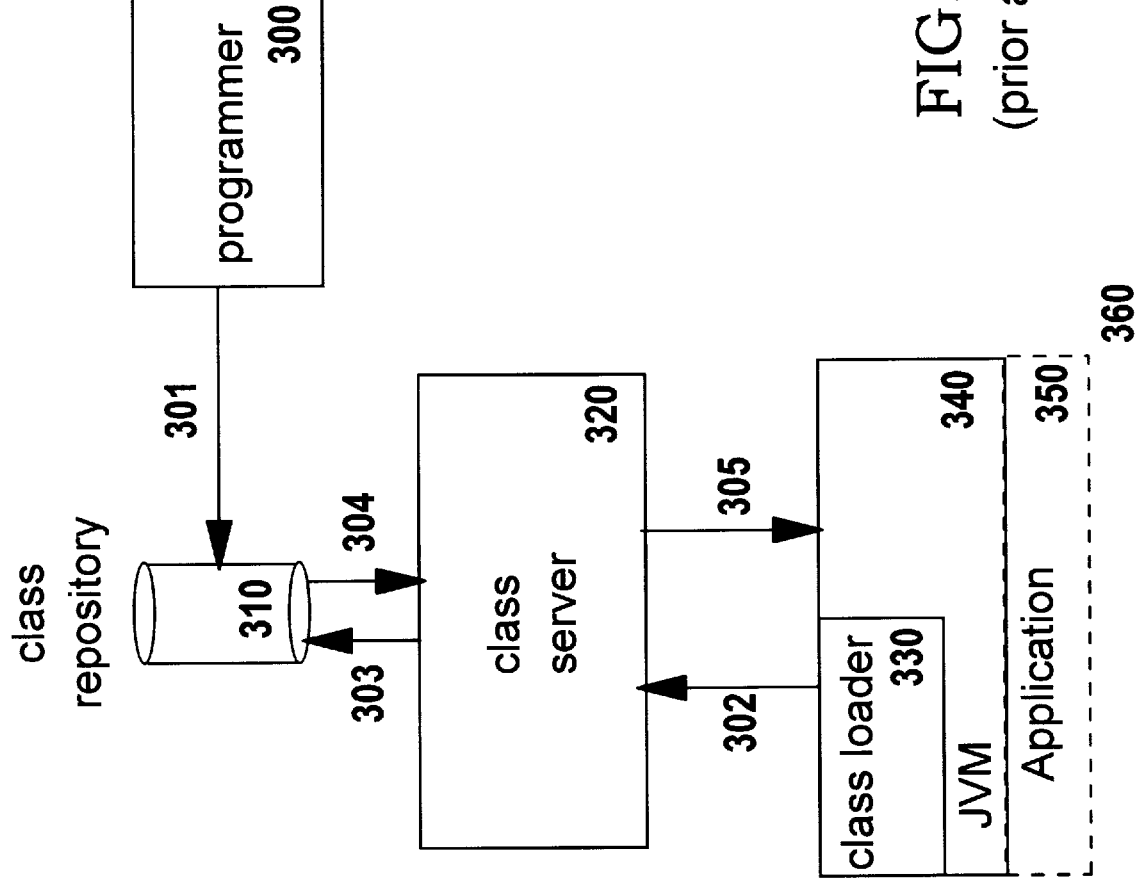
FIG. 3 illustrates the prior art technique of class loading using a Java Virtual Machine.

FIG. 3 illustrates the prior art technique of class loading using a Java Virtual Machine ("JVM"). The class loader function of the JVM allows a Java application program to be loaded incrementally, as the program executes. As is known in the art, the programmer writes a Java program, and then compiles it into Java bytecodes. Files containing the Java bytecodes are called "class files". The programmer 300 then loads 301 the class files into a repository 310 of class files. At some later point, the application program 350 is executed by a JVM 340 on a client computer 360. When the application 350 attempts to use a class that has not been loaded on the client computer 360, the class loader component 330 of the JVM 340 makes a request 302 to a class server 320. (The class server function 320 is typically included in standard Web servers.) This request 302 notifies the class server 320 to fetch 303, 304 the class file from the class repository 310, and return it 305 to the JVM 340. The application 350 then continues executing, using the retrieved class file. This dynamic loading of class files operates transparently to the user of the application 350.

As stated previously, this prior art approach of dynamic loading is limited to retrieval and loading of a predetermined, specified class file. The present invention, by contrast, allows a program component (such as a class file) to be dynamically selected from among one or more choices, based on current values of dynamically changeable attributes. This enables the program component to be specifically tailored to the user's current working environment, authorization privileges, preferences, network connection type, status, or any other factors which have been used as attributes (as will be explained in further detail below).

Figure 4:
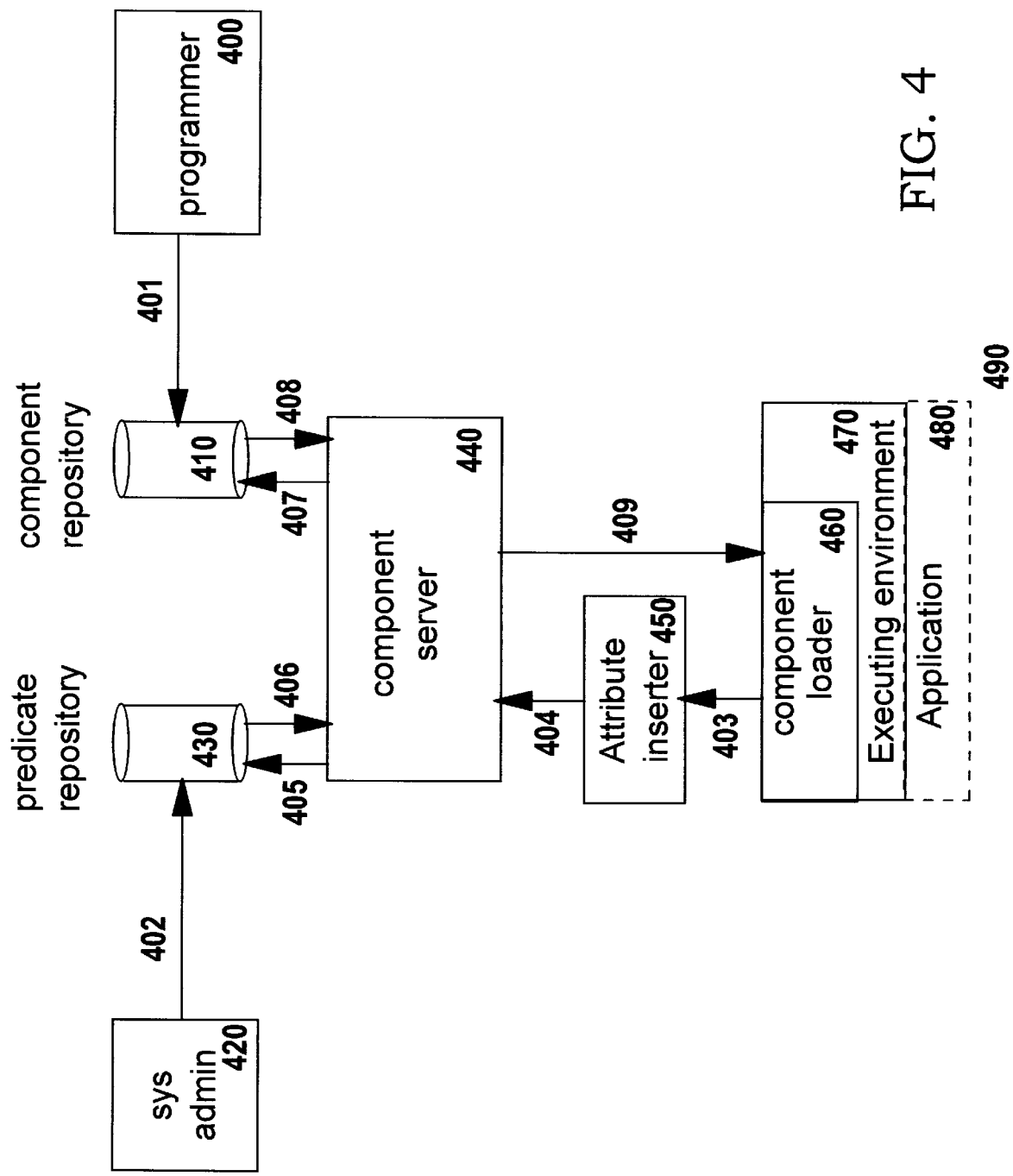
FIG. 4 illustrates the architecture of a preferred embodiment of the present invention, enabling dynamic loading of program components.

FIG. 4 illustrates the architecture of a preferred embodiment of the present invention. In FIG. 4, dynamic loading of program components in the general case is shown. As in FIG. 3, the process begins with a programmer 400 writing program components. These components may be Java classes, or they may be program components written in any other language for which a dynamic component loading mechanism (similar to the Java class loader 330) is provided. The programmer 400 stores 401 the program components into a component repository 410 (which may be simply a database or disk file system).

Unlike the prior art approach, with the present invention the programmer may create multiple versions of selected program components in order to tailor each version of the executable code so that it is optimized for particular users or groups of users, or particular environments of hardware and/or software. By having multiple versions, the programmer still provides applications that are usable by a wide range of users in a wide range of operating environments. As an example, the programmer might choose to create multiple versions of a component that is responsible for the user interface ("UI") of an application. (Note that the choice of which components are adaptable to creation of different versions depends on the particular application being written, its intended users, and the design choices made for that particular program. While the examples used herein refer to selecting from multiple UI modules, this is merely for illustrative purposes and is not meant to limit the present invention in any manner.) One UI component might be created for a typical computer with a typical monitor that is capable of supporting color display and graphics, while a different version might be created for use on handheld devices (such as the IBM WorkPad) having smaller display areas and which may not provide displays in color. A third version might provide an abbreviated version with no images, suitable for users connected using expensive wireless links, whose organizations may choose to reduce costs by transmitting less information. A fourth version of the UI component could be created for use by specific users who are visually impaired, that would present all information in larger fonts, and a fifth version could be created for use by the blind, where this version would invoke routines of a speech synthesizer for information that would otherwise be displayed on a monitor. This example of selecting from five different UI components illustrates use of particular attributes that describe the user's working environment (for the hardware attributes discussed above with reference to the first and second versions), attributes particular to a specific user (his sight capabilities, as discussed with reference to the fourth and fifth versions), and attributes that describe organization policies (for cost attributes discussed above with reference to the third version). One way of representing the latter type of user-specific information is by setting user preferences. According to one aspect of the preferred embodiment, an application program that provides different support based on such factors would enable a user to set his preferences in advance of executing the application. (Alternatively, a systems administrator might set the preferences for a user if those preferences are, for example, security related.) According to another aspect of the preferred embodiment, the application program may access the user's identity from the local machine, add that as an attribute, and then this identity attribute would be used by other components within the network to add further attributes. The specific technique with which users are asked for preference values does not form part of the present invention, and may be accomplished using techniques which are well known in the art, such as pull-down or pop-up menus that can be invoked in a configuration process. According to another aspect of the preferred embodiment, the software on the client's computer may query the operating system or a collection of system attributes, such as the Windows registry, to determine the values of specific attributes. (Windows is a registered trademark of Microsoft Corporation.) The specific technique for extracting attributes from the client's computer does not form part of the present invention.

After the programmer 400 has created and stored 401 the desired versions of the program components, the components are ready to be requested at run-time. According to the present invention, the application program's invocation statements do not refer to the specific versions of the components, but instead refer to a single component name. The version of the named component to be loaded is not determined until the application attempts to execute the component. Using the novel concepts of the present invention, the currently-applicable attribute values are used to select the proper version at that time. Using the UI example described above, the invocation statement would refer to one UI component name, and the desired version from the five available would be selected based on the current attribute values.

A further element of the present invention involves specifying the correspondence between specific values of attributes, and which component version should be selected when those values are present. A person, who will be referred to herein as a systems administrator 420 for ease of reference, defines this correspondence, in advance of a user executing the application containing this component. (The correspondence may be created by any person, including the programmer 400.) According to the preferred embodiment, a set of predicate records is created for each component that has multiple versions. (Alternatively, a predicate record may also be created for a component having a single version.) The predicate records are stored 402 in a predicate repository 430. Each predicate record specifies one or more predicates related to selection of a version of a component, and a reference that can be used to retrieve that version from the repository 430. A predicate is preferably specified as an attribute type and attribute value pair. For example, a predicate may take the form [device=WorkPad], where "device" is the attribute type and "WorkPad" is the attribute value. (The specific syntax used to encode predicate does not form part of the present invention. See FIG. 7 for syntax examples.) When multiple predicates are specified in one predicate record, the principles of Boolean logic are applied to determine if that predicate record is satisfied. That is, operators such as AND, OR, and NOT may be used to specify relationships between the predicates of a given predicate record. Additionally, the order of predicate evaluation within a predicate record may be specified using syntax such as parentheses. When the predicate(s) of a predicate record evaluate to TRUE, then the component reference in that predicate record may be selected by the component server 440 (as further described below).

According to an optional aspect of the present invention, each predicate record set for a given component will include one predicate record using a special predicate "DEFAULT". This special predicate will always evaluate to TRUE, but will be evaluated only when no other predicate record for this component was satisfied. Wildcards may also be used, as described below with reference to FIG. 7.

FIG. 7 illustrates an example of predicate records, and syntax alternatives, in more detail. (Note that while the preferred embodiment of the present invention is discussed in terms of using attribute type/value pairs, one of ordinary skill in the art will realize that other formats may be used equivalently for representing this information, without deviating from the inventive concepts disclosed herein.) Items 700, 710, 720, 730, are shown using a first syntax style, while items 750, 760, 770, 780, 790 are shown using a second syntax style.

As illustrated by item 700, a predicate 703 is defined for a component 701, which in this example is named "Component_for_UI". The component name appears first in each predicate record, indicating that records 710, 720, 730 are also predicate records for the same component as record 700. The component name and predicate are separated in this first syntax by a special character, which in this example is the period symbol 702. A second special character, shown here as the colon symbol 707, separates the rule(s) of the predicate from the component reference. In record 700, the component reference 708 is to the component named "UI_for_graphics". The predicate 703 is comprised of 3 elements. Element 704, "A", is preferably an attribute type. Element 706, "B" is preferably an attribute value. Element 705, "=", is a Boolean operator that returns the result of comparing A to B. Record 710 shows a more complex predicate 713, using the Boolean operators AND 715 and NOT 717, as well as parentheses 716a and 716b.

The component reference may be specified in the predicate records in a number of different ways. Preferably, either a Uniform Resource Locator ("URL") or a file specification will be used. The URL will be useful when the component is to be retrieved using a network connection. A file specification will be useful when the component is stored on a storage device, such as a disk or CD-ROM, that is attached to the computer on which the component server 440 is executing. As another alternative, a component reference may be specified as an executable command (using File Transfer Protocol, or "FTP", syntax, for example) that will be issued to retrieve the component if the predicates of that predicate record are satisfied. When record 720 evaluates to true (i.e. when the value of "C" is "CDPD", as represented by predicate 723), its component reference 728 may be selected. While the component reference 708 was a component name, component reference 728 illustrates another technique whereby a URL that can be used to locate the component is specified as the reference.

Record 730 illustrates use of the special DEFAULT predicate 733. As stated previously, this predicate always evaluates to true, and is used in an optional aspect of the preferred embodiment so that each attempt to locate an appropriate component version will find a matching predicate record. (Alternatively, absence of any matching component record could be handled differently. For example, when no predicate record matches the current attributes, the component name could be used directly as the reference for retrieving the component.)

Preferably, predicate records for a given component will be evaluated in the order in which they physically appear in the predicate record set for that component. Thus, the responsibility falls on the system administrator for entering the predicate records in the correct sequence. Using this approach, the DEFAULT predicate record should appear as the final record of each predicate record set, and more specific predicate records should appear before more general predicate records within each set. (Alternatively, techniques other than physical order may be used for resolving the potential duplicate matches which may occur, without deviating from the inventive concepts of the present invention.)

A second syntax approach is shown in the remaining records of FIG. 7. Here, the component name is not repeated in the predicate records for each of its components, but appears before its set of predicate records, as shown at 750 (for the set containing records 760 and 770) and 780 (for the set containing record 790). Thus, records 760 and 770 may be evaluated when the component name is "Component_ for_print" 750. A different special character has been used in this syntax to separate the predicates from the component reference within each predicate record. The special character is shown here as an arrow symbol "–>" 767. Record 760 contains the predicate 763, testing whether "XYZ>15". Record 770 shows an example of using a wildcard symbol, such as "*", within a predicate. Here, predicate 773 is comparing a department number (indicated by attribute type "dept_nbr" 774) to an attribute value specified at 776 as "C80*3". This syntax may be used to indicate that any value appearing between "C80" and "3" is to be considered as matching this wildcard symbol. One symbol may be used to indicate that a match is limited to one character, while another symbol may be used to indicate that different numbers of characters may be used in the matching process. Such techniques are well known in the art.

Returning now to FIG. 4, the dynamic selection of the present invention occurs as an application program 480 is executing on a client computer 490. The executing application 480 attempts to use a component that has not been loaded. This causes component loader 460 in the execution environment 470 to make a request 403 to a component server 440. That request 403 contains the name of the component requested, and may contain other data as needed to define the context of the application generating the request. (For example, it may be that two separate JVMs are executing in the workstation 490. To clearly distinguish between them, so that responses will be returned to the correct JVM, a process identifier or thread identifier may be passed along with the request 403.) Unlike requests 302 that are sent from the class loader 330 to the class server 320 of the prior art, the request 403 may be sent to the component server 440 with one or more attributes specified. To use the benefits of the present invention, each request 403 for a component for which multiple versions exist must be sent with one or more attributes. However, the present invention may also be used advantageously with a back-level client implementation that does not send attributes. In that situation, the absence of any attributes will cause the special DEFAULT predicate record to be matched, and the component version referenced in that predicate record will be selected and loaded. In addition, if the user's identity is known to an attribute server residing on component server 440, attributes may be added when the request reaches this attribute server based on information extracted from a network database containing information about user preferences and authorizations or through equivalent means that would be apparent to one skilled in the art.

The code that supplies the attributes to be sent with request 403 will be referred to herein as an "attribute inserter". FIG. 4 shows a single attribute inserter 450, logically placed between the component loader 460 and the component server 440. This depiction is used to show that the attribute inserter 450 can be thought of as intercepting each request 403, after it is created by the component loader 460 and before it arrives at the component server 440. However, the attribute inserter function may reside on the client computer 490 (e.g. within the component loader 460), on the same computer on which component server 440 resides, or somewhere in between (for example, at a proxy server in the network). The attribute inserter 450 inserts a set of currently-applicable attributes as part of the request 403, creating request 404. This request is then forwarded to the component server 440.

When the component server 440 receives the request 404, instead of simply retrieving a predetermined component from a component repository as in the prior art, the component server 440 uses the component name from the request 404 to access 405, 406 the set of predicate records stored in predicate repository 430. The component server 440 compares the attributes from the request 404 to the predicate records for the requested component, until locating a matching predicate record. (See the discussion of predicate records above, referring to FIG. 7, for more information on this matching process.) The component server 440 then uses the component reference from this predicate record, to retrieve 407, 408 the selected version of the component from the component repository 410. That retrieved version is then returned 409 to the component loader 460. As in the prior art, the retrieval process is transparent to the user of application 480 (except to the extent that the user may have pre-specified some information, such as user preferences, that will be used in creating the attributes at attribute inserter 450).

Figure 5:
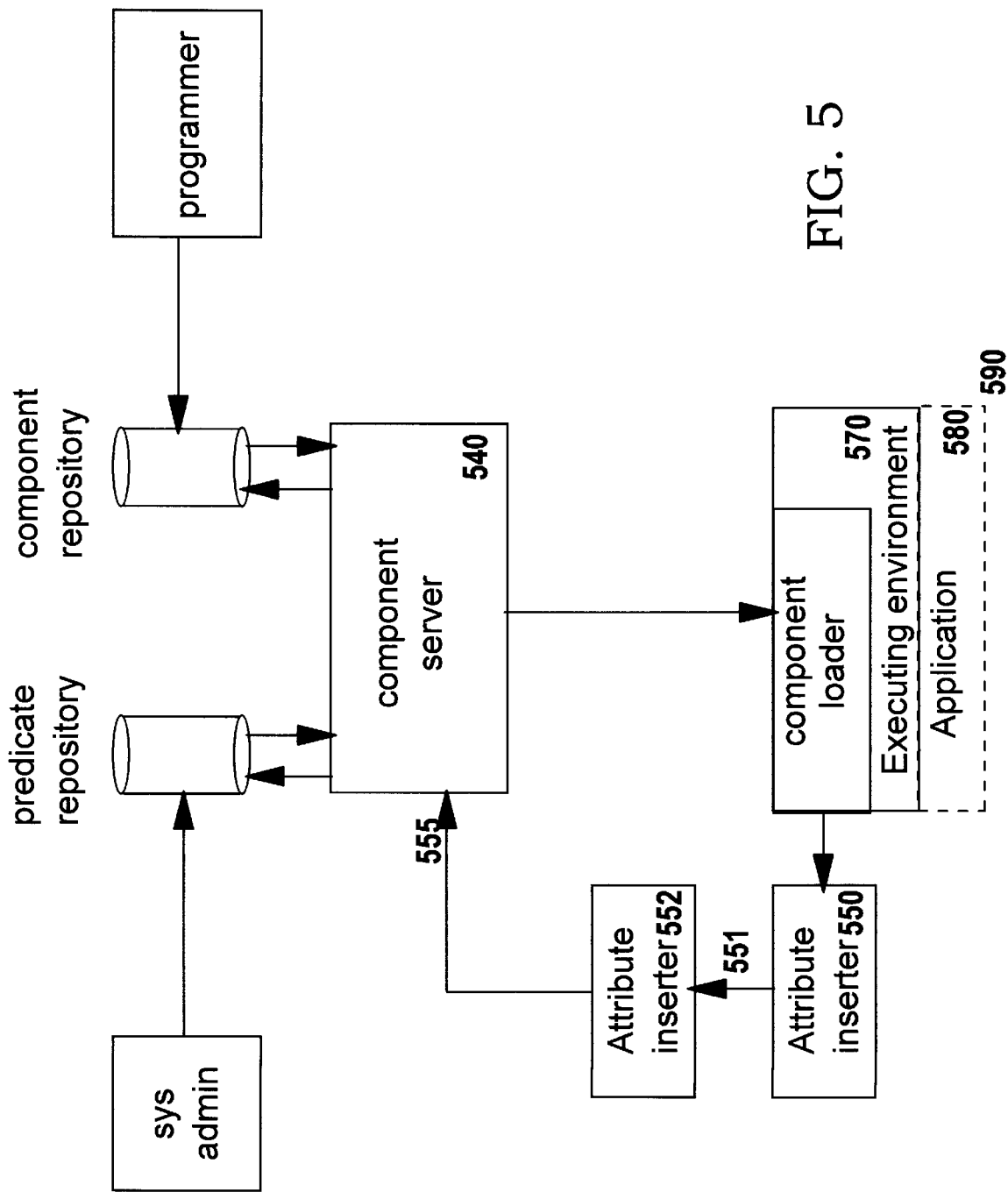
FIG. 5 shows an optional enhancement of the architecture of FIG. 4.

FIG. 5 shows an optional enhancement of the architecture of FIG. 4, where more than one attribute inserter may be used. FIG. 5 shows two attribute inserters 550 and 552 for illustrative purposes: more or fewer attribute inserters may be used in a specific implementation. Multiple attribute inserters may be used in a chained configuration, as shown here, whereby the output 551 of a first attribute inserter 550 is fed into a next attribute inserter 552, and so forth, with the output 555 of the final inserter (inserter 552, in this example) being sent to the component server 540. This chained approach may be useful, for example, where each individual attribute inserter specifies a certain type of attributes.

An example of using chained attribute inserters will now be discussed, where three logically-separate attribute inserters provide three different types of attribute information. Suppose that a first inserter executes on the client machine (not shown in FIG. 5), and supplies attributes related to the user and the hardware and/or software running on his machine 590; a second inserter 550 resides in the network, add specifies attributes related to the network connection; and a third inserter 552 resides on a proxy server in the network and specifies attributes related to administrative policy for various classes of users or administratively controlled user preferences. (This attribute inserter strategy is for illustrative purposes only. While not shown in FIG. 5, an attribute inserter may also reside on the same computer as component server 540.)

The first "client attribute" inserter may establish the context in which a component loading request originated, e.g. by testing the value of one or more attributes returned from a query of the local hardware or software. For example, the inserter may query the device configuration to determine the specific device type (such as "WorkPad", or some device model number). Or, the inserter may determine which level of a programming language is supported by the executing environment 570 by issuing an appropriate query. At the same time, information about this particular user may be obtained by querying information stored from a log-on process, configuration process, etc. This user information may include, but is not limited to, the user preferences and status information about the user which were discussed earlier. For example, a log-on process may have requested a user identification that can be used to determine if this person has the employment status of "employee", "manager", or otherwise. The set of attributes retrieved by this client attribute inserter will be added to the component request, and forwarded to the next inserter 550.

The attribute inserter 550 might specify, for example, attributes related to the network connection type currently being used by the client machine 590. As an example of using this type of information, the application 580 might be preparing to download files from the network, for display on the client machine 590. If the current connection supports high speed and high bandwidth, then the application could conceivably display a multimedia presentation of the downloaded information. But if the current connection supports only low speed data transfer, this information could be used as an attribute to select a simplified version (omitting video and sound, for example) of the downloaded information. The attribute specification technique of the present invention could be used to retrieve the different versions of the information to be displayed, and/or different versions of an interface module that would be used for retrieving the information.

The third "proxy attribute" inserter 552 may access a network database or directory for further attribute information. IBM's eNetwork On-Demand Server product, for example, manages access to remotely stored applications based on user-specific profiles, client machine types, and administrative policy information. Passwords and other access data are stored on the server, and used as a central point of control for users wishing to access the remote applications. As an example of administrative policy usage, an entry might specify that an application should use one predefined set of attributes if the user's machine is a WorkPad with CDPD connectivity, and a different predefined set if using a WorkPad that is tethered to an office machine. In this example, the inserter 552 uses attributes inserted by earlier inserters (e.g. the user identification, device type, and connection type), and bases its inserting decisions on those values. As an example, suppose the client inserter indicated that this user is John Doe and his device is a WorkPad, while inserter 550 indicated that the WorkPad is currently connected using CDPD. Inserter 552 may retrieve a first set of attributes that has been stored for WorkPad users connected by CDPD, and a second set of user preferences stored for user John Doe. A pruning process may then be applied, to remove any attributes from the first set that are made redundant by the preferences of the second set, or to use values from the first set to select among multiple choices for attribute values in the second set. (For example, a user John Doe may have two sets of attributes stored, one for use when he is connected with CDPD, and another for use when he is connected using a LAN. The pruning process would remove all LAN-connected attribute values when it detects that the current connection attribute value is CDPD.) If no attributes had been inserted by earlier inserters, then proxy attribute inserter 552 could supply an entire set of attributes to be used. (Refer to "www.software.ibm.com/enetwork/on-demand" on the World Wide Web for more information on the eNetwork On-Demand Server, or contact your nearest IBM branch office.)

Figure 6:
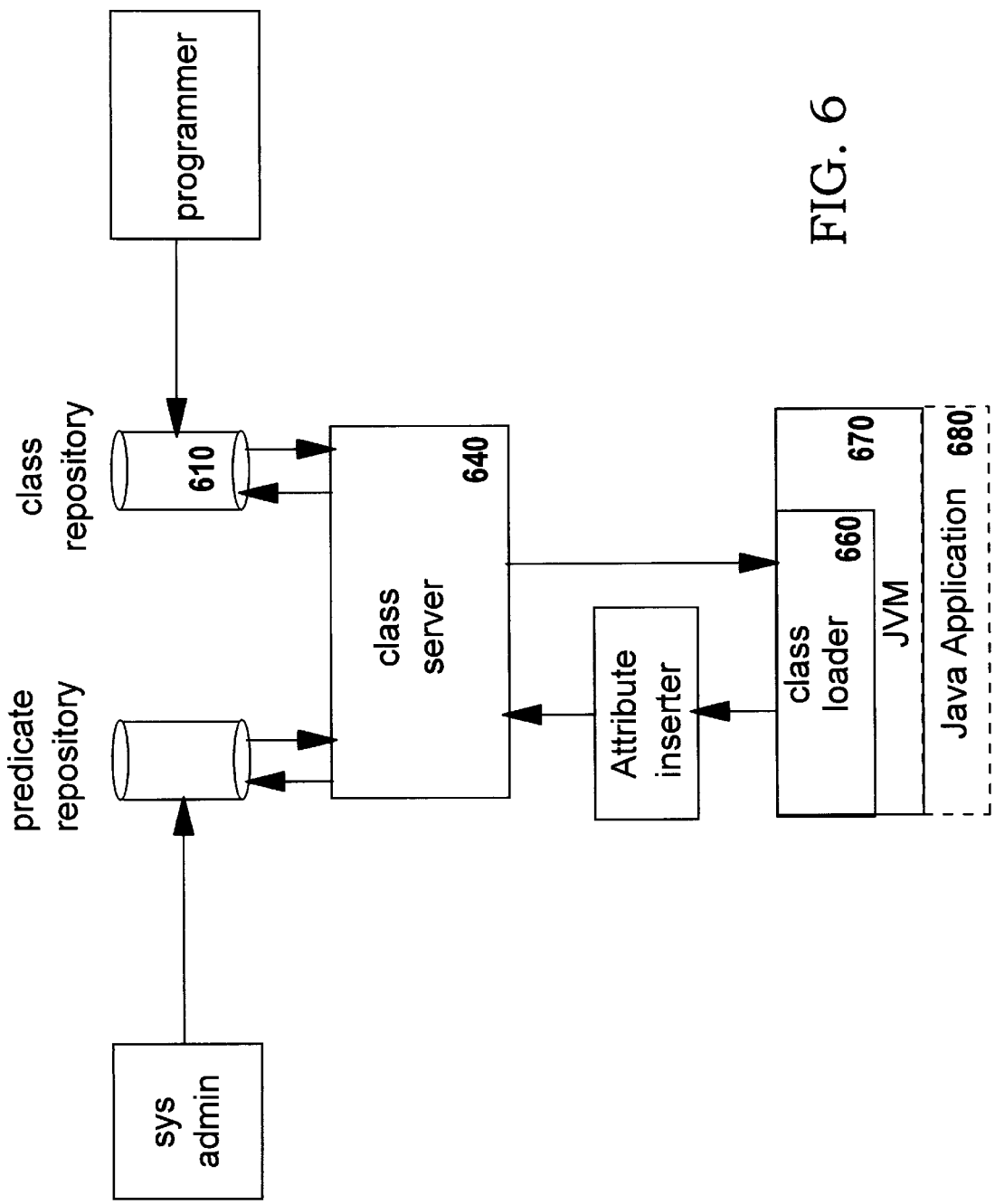
FIG. 6 shows how the architecture of FIG. 4 may be adapted to class loading using a Java Virtual Machine.

FIG. 6 shows how the architecture of FIG. 4, presenting the preferred embodiment of the present invention, may be adapted to class loading using a Java Virtual Machine. The application 480 described with reference to FIG. 4 is now a Java application 680 in FIG. 6; the executing environment 470 is now a JVM 670; the component loader 460 is a class loader 660; the component server 440 is a class server 640; and the component repository 410 is a Java class repository 610.

While the preferred embodiment has been described in terms of selecting a version of a component for downloading to a client machine, in another aspect of the present invention, the selected component version is not downloaded. Instead, a specific component version from among multiple versions that are available is selected for remote execution. This will be useful, for example, when RPC is used to call remotely-located procedures. As described earlier, an application making use of the RPC protocol is compiled with stubs that represent the remotely-located code, and the procedure call is executed by sending a request to a remote computer. The request is executed on that remote computer, and a result is returned to the client's computer. The present invention may be used on the remote computer, to select a specific version of the remotely-stored code. This assumes that the attribute information is also passed to the remote computer, to enable it to make the dynamic component selection. Alternatively, the dynamic selection based on attributes could be performed on the local machine, before the remote procedure call was actually issued over the network. In that situation, multiple versions of the procedure call would be accessible on the local machine. After control had reached the stub (indicating that the remote call should occur), the attributes would be evaluated locally, and the appropriate version of the procedure call (based on that dynamic evaluation) would be selected. The selected procedure call would then be issued.

In a further aspect of the present invention, the code that selects and retrieves a program component may operate on the local machine (in a similar manner as that just described with respect to selecting a procedure call locally). In this aspect, the attribute evaluation would be performed locally, and a search of available components conducted to determine if the selected version was accessible to the local machine (e.g. either stored on the local machine, or available from a locally-attached file system). If the selected version was not available locally, then a request would be sent into the network to retrieve that component from a remotely-located component repository. If the selected version is available from the local system, then it will be loaded and used without sending a request into the network. Accordingly, while the term "downloading" is used herein, it is to be understood that this term also comprises the possibility for locally loading a component. Similarly, the term "loading" is to be understood as comprising the possibility of downloading a component, except where indicated that the loading is performed locally on a client.

In yet another aspect of the present invention, Java RMI may be used to access methods of remotely-located Java objects, in a similar manner to that described above for invoking procedure calls remotely using RPC. The Java program running on the client's workstation makes a call on a remote object using a reference to the remote object. (Note that this object reference is to be distinguished from the component references in the predicate records of the present invention. RMI's remote object reference is analogous to the component names discussed herein.) The technique with which an object reference is determined is defined by RMI, which provides that the object reference may be looked up in a bootstrap naming service, or it may have been received as an argument or a return value. This object reference is specified in the Java method invocation. Attributes may be used locally, according to the present invention, to select among several alternative object references in order to select a particular version of the method for invocation. The selected method from the remote object would then be accessed with RMI. Or, a predetermined reference may be issued from the local machine, where the techniques of the present invention would be applied remotely, once the request reached a server in the network. The attributes passed to this server would then be used to direct the method invocation to a selected version of the object specified on the request.

In still another aspect of the present invention, the attributes may be evaluated remotely for the purpose of selecting from among multiple versions of a servlet that could be used to remotely perform a given function. A servlet version satisfying the predicate records for the desired function would be invoked by a server, and the output of that servlet version returned to the client workstation as the result of processing the function. Or, a specific servlet may be invoked by the server, with the component selection process performed within that servlet. This selection process would determine which component to access (such as another servlet) in order to execute the desired version of functionality.

FIGS. 8A–8F2 show an example program using the present invention, for calculating mortgage payments. This program takes as input the size of the loan, the duration of the mortgage and interest rate, and calculates the monthly payment using a standard amortized mortgage formula. The program consists of four components: (1) a main routine, (2) a payment calculation routine, (3) an input routine, and (4) an output routine. A class is defined, that holds the key parameters. This class object is depicted in FIG. 8A. (Refer to "Java in a Nutshell", 2nd ed., David Flanagan, O'Reilly (1997) for a description of the syntax used in this example, which also makes use of pseudocode.)

The main routine is responsible for displaying the interface, obtaining the user input, calling the calculation routine, and displaying the result. The pseudocode shown in FIG. 8B may be used to represent this functionality. The payment calculation routine component is quite simple. It takes as parameters the loan size, mortgage duration and interest rate (all of which are stored in a MortgageParameters class object), and returns the monthly payment. Pseudocode for this module is presented in FIG. 8C. (The details of the calculation have been omitted, as they are not pertinent to the scope of this example.)

The user interface module is responsible for interacting with the user. In this example, two alternative versions of the UI module are presented: one version is graphical, and would typically be used for traditional computers with large screens; and one version is text-based, for screen-constrained devices such as cellular phones. Both versions have identical interfaces to the rest of the application (that is, each returns the same information, using the same variable names), but each version displays information differently to the user. These examples are presented in skeletal pseudocode, but implementation in an actual computer language will be obvious to one of ordinary skill in the art. FIG. 8D1 shows the graphical UI, having the module name "UserInput_GUI", and FIG. 8D2 shows the text-based UI, having module name "UserInput_TEXT". These two versions of the UserInput class differ both in how they look (one is graphical, the other text-based), and how they operate (the graphical version has the user enter all the required data, and then press an OK button; the text-based version waits for each piece of data to be entered, and then asks for the next). The graphical version may be considered a superior interface, and is preferred if the accessing device supports such an interface; the text-based interface is suitable for text-only devices such as cell-phones.

The output routine similarly has two versions, which are shown in FIGS. 8E1 and 8E2 as modules "UserOutput_GUI" and "UserOutput_TEXT". As with the two versions of the input routine, the output versions differ both in display mode (GUI versus text), and in how they operate (the text version simply prints the result; the GUI version also graphs the amount of the loan to be repaid over time). Again, the GUI version is considered preferable, but only where it will display properly.

As described above with reference to FIG. 4, the programmer would insert the six components depicted in FIGS. 8B–8E2 into the component repository 410. The systems administrator then defines predicates to enable selecting the appropriate component, according to the present invention, and enters the predicate records into the predicate repository 430. FIG. 8F1 shows a set of predicate records that may be used with the components of this example. Note that for this example, a naming convention has been adopted whereby the component reference is formed by appending the component's name, then a double underscore, and then a tag describing the module's usage. For example, to differentiate between the text and GUI versions of the UserInput component, the component name "UserInput" appears first, followed by either "_TEXT" (as in 810 and 830) or "_GUI" (as in 820 and 840). It will be apparent to one of ordinary skilled in the art that many alternative naming conventions may also be used, without deviating from the scope of the present invention.

At some point after the components and predicate records have been defined and entered into the repositories, the user starts the program by requesting the MortgageCalc class. Assume for this example that the user is using a cell phone as his workstation 490, so that only a simple user interface is appropriate. The attribute inserter 450 would intercept the request 403 for the MortgageCalc class, and insert the attribute "GUI=false", which flows with the component request 404 to the component server 440. The component server 440 then accesses 405 the predicate repository 430, to determine which version of the MortgageCalc class should be selected. Finding only the special DEFAULT predicate 880 for the component named "MortgageCalc", the component server 440 simply requests 407 and retrieves 408 the specified component reference 882 (which in this example is also "MortgageCalc") from the component repository 410. This component is returned 409 to the component loader 460, and the program's execution continues. In an embodiment where the DEFAULT predicate is not used, the component server 440 would simply find no predicate records for the component named "MortgageCalc". In that situation, the component name would preferably be used to request and retrieve the component from the component repository 410.

When the MortgageCalc component executes, it attempts to instantiate a UserInput component (as indicated in FIG. 8B at 802), which causes the component loader 460 to make another request 403 to the component server 440. This time the request 403 is for a component named "UserInput". The request 403 is again intercepted by the attribute inserter 450, which inserts the attribute "GUI=false" (again, representing the simplified user interface of the user's cellular phone). The component server 440 accesses 405 the predicate repository 430 for predicates related to the UserInput component, and finds records 810 and 820. The component server 440 then extracts the attributes from the request 404, which in this case indicates that "GUI=false". The component server 440 uses this attribute, matching it first against the predicate "GUI=true" in predicate record 810. Since that comparison does not yield a successful match, the predicate record 820 is checked next. This time, the attribute matches the specified predicate, so that the predicate record is satisfied. Accordingly, the component reference "UserInput_TEXT" 822 is indicated as the version of the component to be selected from the component repository 410 and returned 409 to the component loader 460. Since the "_TEXT" suffix has been used here simply for purposes of reference, enabling lookup of the proper component version from the repository, that suffix is preferably removed from the filename before the component is returned.

For the mortgage calculation program, the component loader 460 would then request the RateCalculator component (at 804 of FIG. 8B) and the UserOutput component (at 806 of FIG. 8B). These requests would be processed in the same manner described above for the MortgageCalc and UserInput components, respectively.

If this mortgage calculation application were executed on a standard personal computer instead of on a cellular phone, the attribute inserter 450 would insert the attribute "GUI=true", indicating that a typical graphical user interface was available. This would cause the component server 440 to select the UserInput_GUI component (see 810 of FIG. 8F1) and the UserOutput_GUI component (see 830 of FIG. 8F1), instead of the "_TEXT" versions selected when "GUI=false" for the cellular phone.

As has been stated, the present invention is not limited to selecting between graphical and text-based versions of user interface components. Extending the current example slightly, suppose that on a very slow network link, to reduce download time, the smallest component available might be desired even though a GUI-capable device was being used. In that case, the attribute might be "network_speed=2" (where values for the attribute type network_speed are specified by the attribute inserter in terms of kilobits per second). The systems administrator might have chosen to supply alternative predicates as shown in FIG. 8F2, to accommodate selecting a component version using the network speed attribute. Predicate record 850, if appearing as the first predicate record (i.e. before records 810, 820, 830, 840), would cause the text-based version of the UI module to be selected whenever the network speed was less than or equal to 14 kilobits per second. Predicate record 860 causes the GUI version to be selected when the network speed is greater than 14 kilobits, and the "GUI=true" attribute has also been inserted. Predicate 870 shows a further example, using wildcard syntax. The wildcard has been used here for the component name 871, 872, indicating that text-based versions of all components should be selected when the predicate "network_speed<14" is satisfied.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. Computer readable code embodied on one or more media which are readable by a computer system, for dynamically selecting a Java class for downloading based on current values of changeable attributes, comprising:

a subprocess for receiving a request for executing a particular named Java class during execution of a Java application on a client device;

a subprocess for obtaining a set of currently-applicable attribute values, wherein the attribute values represent one or more of: (1) a network connection type with which the client device is connected across a network to a server device executing a Java class server; (2) preferences of a user of the Java application; (3) hardware of the client device; (4) software of the client device; (5) authorization privileges of the user; (6) status characteristics of the user; and (7) an applicable administrative policy;

a subprocess for comparing the currently-applicable attribute values to a set of predefined predicate records for the named Java class to determine if a particular optimized version of the named Java class is available which is specifically adapted to the currently-applicable attribute values;

a subprocess for downloading, by the Java class server, to the client device for execution by the Java application, either (1) the particular optimized version of the named Java class or (2) a default version of the named Java class, depending on an outcome of the subprocess for comparing; and a subprocess for transparently executing the downloaded particular optimized version or the default version, as appropriate, during execution of the Java application, as if the named Java class was being executed.

2. The computer readable code according to claim 1, wherein the subprocess for obtaining operates on more than one of: the client device, the server device, and an intermediate device in the network, and wherein a chaining approach is used between the more than one operations.

3. A system for dynamically selecting a Java class for downloading based on current values of changeable attributes, comprising:

means for receiving a request for executing a particular named Java class during execution of a Java application on a client device;

means for obtaining a set of currently-applicable attribute values, wherein the attribute values represent one or more of: (1) a network connection type with which the client device is connected across a network to a server device executing a Java class server; (2) preferences of a user of the Java application; (3) hardware of the client device; (4) software of the client device; (5) authorization privileges of the user; (6) status characteristics of the user; and (7) an applicable administrative policy;

means for comparing the currently-applicable attribute values to a set of predefined predicate records for the named Java class to determine if a particular optimized version of the named Java class is available which is specifically adapted to the currently-applicable attribute values;

means for downloading, by the Java class server, to the client device for execution by the Java application, either (1) the particular optimized version of the named Java class or (2) a default version of the named Java class, depending on an outcome of the means for comparing; and means for transparently executing the downloaded particular optimized version or the default version, as appropriate, during execution of the Java application, as if the named Java class was being executed.

4. A method of dynamically selecting a Java class for downloading based on current values of changeable attributes, comprising steps of:

receiving a request for executing a particular named Java class during execution of a Java application on a client device;

obtaining a set of currently-applicable attribute values, wherein the attribute values represent one or more of:

(1) a network connection type with which the client device is connected across a network to a server device executing a Java class server; (2) preferences of a user of the Java application; (3) hardware of the client device; (4) software of the client device; (5) authorization privileges of the user; (6) status characteristics of the user; and (7) an applicable administrative policy;

comparing the currently-applicable attribute values to a set of predefined predicate records for the named Java class to determine if a particular optimized version of the named Java class is available which is specifically adapted to the currently-applicable attribute values;

downloading, by the Java class server, to the client device for execution by the Java application, either (1) the particular optimized version of the named Java class or (2) a default version of the named Java class, depending on an outcome of the comparing step; and transparently executing the downloaded particular optimized version or the default version, as appropriate, during execution of the Java application, as if the named Java class was being executed.

* * * * *